(12) United States Patent
Nishimura

(10) Patent No.: US 6,597,400 B2
(45) Date of Patent: Jul. 22, 2003

(54) IMAGE PICKUP APPARATUS AND A METHOD FOR OPERATING SAME

(75) Inventor: Yoshihiko Nishimura, Tokyo (JP)

(73) Assignee: Sony Corporation (JP)

( * ) Notice: Subject to any disclaimer, the term of this patent is extended or adjusted under 35 U.S.C. 154(b) by 0 days.

(21) Appl. No.: 09/855,157

(22) Filed: May 14, 2001

(65) Prior Publication Data

US 2002/0105588 A1 Aug. 8, 2002

(30) Foreign Application Priority Data

May 18, 2000 (JP) ........................ 2000-146709

(51) Int. Cl.⁷ .................. H04N 5/222; G03B 13/02
(52) U.S. Cl. ................... 348/333.02; 348/333.06; 348/333.09; 396/374; 396/296
(58) Field of Search ................ 348/333, 372, 348/373, 333.01, 333.02; 396/85, 374, 281, 296, 51

(56) References Cited

U.S. PATENT DOCUMENTS 5,729,289 A * 3/1998 Etoh .......................... 348/333
6,091,450 A * 7/2000 Hirasawa ..................... 348/333

FOREIGN PATENT DOCUMENTS

JP   404368081 A  * 12/1992  .......... H04N/5/782

* cited by examiner

Primary Examiner—Ngoc-Yen Vu
Assistant Examiner—Nhan Tran
(74) Attorney, Agent, or Firm—Lerner, David, Littenberg, Krumholz & Mentlik, LLP

(57) ABSTRACT

An image pickup apparatus and its method of operation eliminate complicated operations of a touch panel and simplify its operation. An image pickup apparatus has an electronic viewfinder provided on a video camera body so as to enable a user to watch a shooting subject image through an eyepiece. A liquid crystal display monitor externally provided on the video camera body includes a touch panel on a display screen thereof. A plurality of icons representing distinct operations of the image pickup apparatus are displayed at predetermined positions of a finder screen of the electronic viewfinder. Touch sensitive areas of the touch panel corresponding to the icon positions displayed on the finder screen can be touch-operated to select a desired operation.

8 Claims, 5 Drawing Sheets

IMAGE PICKUP APPARATUS AND A METHOD FOR OPERATING SAME

CROSS-REFERENCE TO RELATED APPLICATIONS

The present application claims priority from Japanese Application No. P2000-146709 filed May 18, 2000, the disclosure of which is hereby incorporated by reference herein.

BACKGROUND OF THE INVENTION

The present invention relates to an image pickup apparatus, for example, for use in a consumer video camera or the like, as well as a method for operating same. More particularly, the present invention relates to an image pickup apparatus and its method of operation which, when a user takes a picture through an electronic viewfinder, operation buttons displayed on a finder screen in the form of icons can be selected with ease using a liquid crystal display monitor as a touch pad.

Conventionally, in a video camera apparatus including both a liquid crystal display monitor having touch panel functions and an electronic viewfinder, when a user takes a picture through the electronic viewfinder, for example, a plurality of operation buttons are displayed on a finder screen in the form of icons, together with a subject image. A user can select a plurality of operation buttons on this finder screen by operating a touch panel, making use of a liquid crystal display monitor in a blind-touch manner.

In this case, the touch panel is such that the whole touch pad is divided vertically into three touch-sensitive areas. For example, the right and left touch-sensitive areas are used to move a cursor in the right and left directions on the finder screen. The central touch-sensitive area is used to set an operation button designated by the cursor. Therefore, to select a certain operation button, the user must move a cursor to place it on the desired operation button by pressing the right or left touch-sensitive areas of the touch panel, and then must press the central touch-sensitive area of the touch panel to actuate the selected button.

However, because the user must perform the button selection operation described above while he watches a subject through the electronic viewfinder, the operation will be complicated. Moreover, because the user must touch the touch panel many times, it takes a lot of time to select a certain operation button. These problems may cause a user to miss crucial shooting conditions.

SUMMARY OF THE INVENTION

The present invention has been made to solve the above problems and seeks to provide an image pickup apparatus in which complicated touch panel operations can be eliminated and a simpler operation can be expected.

To attain the above objects, an image pickup apparatus according to one aspect of the present invention includes a body having an image pickup element for converting an incident image into a video signal, a recording mechanism for recording the video signal and a playback mechanism for reproducing the video signal; an electronic viewfinder provided on the body to enable a user to watch a shooting subject image through an eyepiece, the viewfinder displaying a series of icons at predetermined positions thereof, each icon representing a distinct operation; a display externally provided on the body, the display having a touch panel provided thereon, the touch panel having a series of actuating areas located in set positions relative to the display, each set position corresponding to one of the predetermined positions of the viewfinder, whereby the operation represented by an icon in one of the predetermined positions can be selected by touching the actuating area of the touch screen in the set position corresponding to the one of the predetermined positions.

Another aspect of the present invention provides a method of operating an image pickup apparatus having a body, an electronic viewfinder mounted on the body to enable the user to watch a shooting subject image through an eyepiece, and a display externally mounted on the body, the display having a touch panel provided thereon. The method consists of displaying in the viewfinder a series of icons at predetermined positions thereof, each icon representing a distinct operation; providing the touch panel with a series of actuating areas located in set positions relative to the display, each set position corresponding to one of the predetermined positions of the viewfinder; and selecting the operation represented by an icon in one of the predetermined positions by touching the actuating area of the touch screen in the set position corresponding to the one of the predetermined positions.

According to the above image pickup apparatus and its operation method, when a user takes a picture through an electronic viewfinder, a user can select and determine a specific operation by blind-touching the touch panel position corresponding to the position of the icon representing that specific operation as it is displayed on the finder screen.

Moreover, because the icons are displayed at the four corners of the finder screen and the touch-sensitive areas which are used to selectively actuate the operations are provided on the touch panel at its four corners corresponding to the icon displayed positions, the touch-sensitive area positions are made clear so that a user can perform a blind-touch operation without fail, thereby allowing operability to be improved.

DETAILED DESCRIPTION

An image pickup apparatus and its method of operation according to an embodiment of the present invention will be described below with reference to the drawings, where the present invention is applied to a consumer video camera apparatus by way of example.

Figure 1:
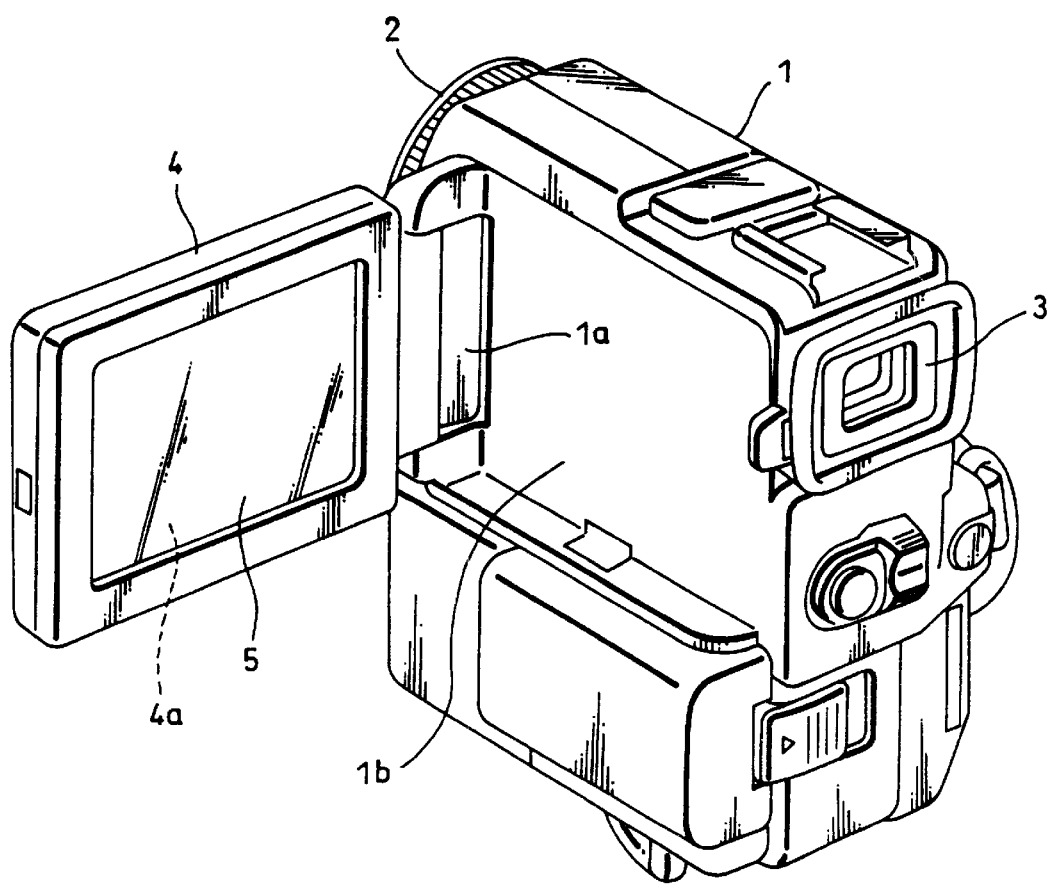
FIG. 1 is a perspective view of an outward appearance of a video camera apparatus in the shooting state using a liquid crystal display panel.
Figure 2:
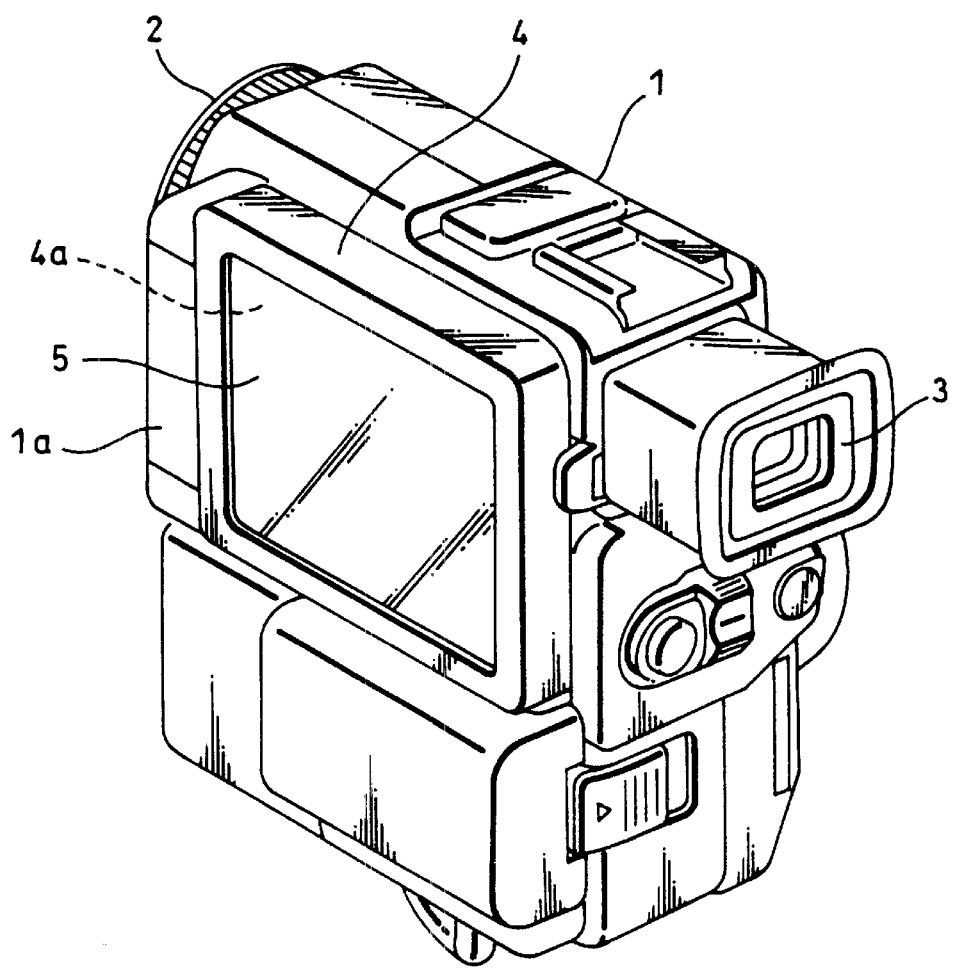
FIG. 2 is a perspective view of an outward appearance of a video camera apparatus in the shooting state using an electronic viewfinder.

FIG. 1 is a perspective view of the outward appearance of a video camera apparatus by which a user takes a picture using a liquid crystal display monitor. FIG. 2 is a perspective view of the outward appearance of a video camera apparatus by which a user takes a picture using an electronic viewfinder.

A video camera body (apparatus) 1 incorporates therein a CCD (charge-coupled device) for converting a subject image incident from an image pickup lens 2 through an optical lens group into a video signal and a recording and playback mechanism section including a magnetic tape that can be charged and discharged as a recording medium used to record and reproduce a video signal and an audio signal picked up from a microphone. Moreover, still pictures obtained from the video signal may be recorded on a stick-like recording medium.

The video camera body 1 has at its upper rear portion an extendable and retractable electronic viewfinder 3 to enable a user to take a picture through an eyepiece. The video camera body 1 has on its side portion an external liquid crystal display monitor 4 including a display screen 4a. This liquid crystal display monitor 4 can be pivoted and rotated relative to the video camera body 1 through a hinge portion 1a and can be stored in a recess 1b of the video camera body 1. A touch panel 5 made of a transparent material is attached to the display screen 4a of the liquid crystal display monitor 4. The touch panel 5 is formed of a monitor having a built-in proximity sensor, for example.

Figure 3:
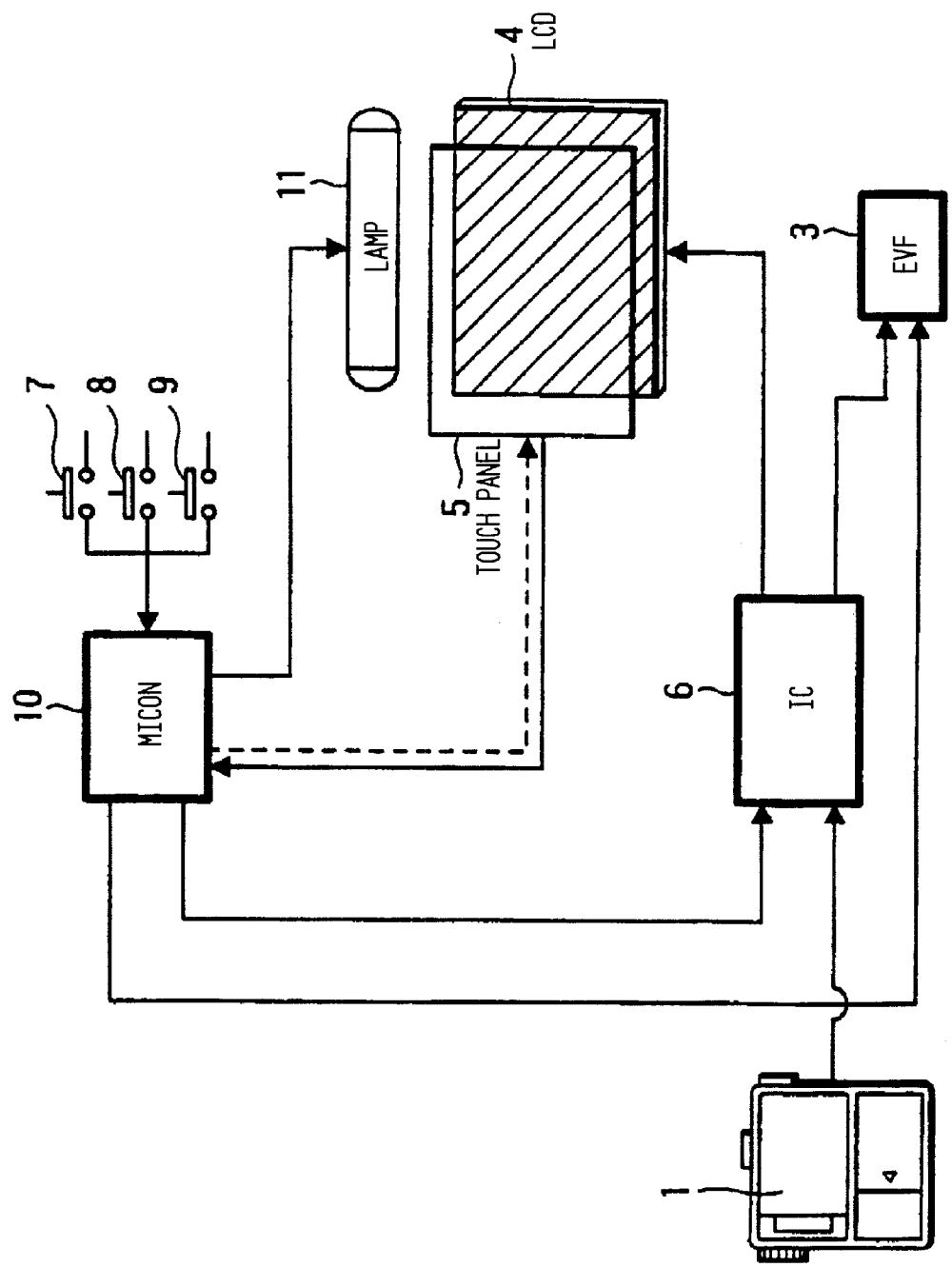
FIG. 3 is a circuit diagram of a video camera apparatus, partially in block form.

FIG. 3 is a circuit diagram of a signal system of the above video camera apparatus, partially in block form.

A video signal output from the CCD of the video camera body 1 is converted into an LCD image signal by an image display depicting IC 6 and thereby displayed on the liquid crystal display monitor as an image. The electronic viewfinder 3 includes a finder detection switch 7 for detecting the viewfinder's retracted (not in use)/extended (in use) state. The liquid crystal display monitor 4 includes a monitor open and close detection switch 8 for detecting the monitor's open/close state and a monitor reverse detection switch 9 for detecting whether the display screen 4a of the liquid crystal display monitor 4 is stored in a normal direction or in a reversed direction.

There exist eight combinations of detected states of these three detection switches 7, 8, 9. Table 1 illustrates that when the finder detection switch 7 is off, the viewfinder is retracted or "stored"; when the finder detection switch 7 is on, the viewfinder is extended or "extracted"; when the monitor open and close detection switch 8 is off, the monitor is "closed"; when the monitor open and close detection switch 8 is on, the monitor is "opened"; when the monitor reverse detection switch 9 is being de-energized, the monitor is stored in the "normal direction"; and when the monitor reverse detection switch 9 is on, the monitor is stored in the "reverse direction".

TABLE 1

| | Finder detection switch (7) | Monitor open and close detection switch (8) | Monitor reverse detection switch (9) |
|---|---|---|---|
| first combination | Stored | closed | normal direction |
| second combination | Stored | closed | reverse direction |
| third combination | Stored | opened | normal direction |
| fourth combination | Stored | opened | reverse direction |
| fifth combination | Extracted | closed | normal direction |
| sixth combination | Extracted | closed | reverse direction |
| seventh combination | Extracted | opened | normal direction |

TABLE 1-continued

| | Finder detection switch (7) | Monitor open and close detection switch (8) | Monitor reverse detection switch (9) |
|---|---|---|---|
| eight combination | Extracted | opened | reverse direction |

The detected states based on the combinations of the above three detection switches 7, 8, 9 are controlled by a microcomputer (hereinafter referred to as a "micon" 10).

According to the first combination, because the liquid crystal display monitor 4 is stored in the normal direction and the electronic viewfinder 3 also is stored, the backlight lamp 11 of the liquid crystal display monitor 4 is turned off and the electronic viewfinder 3 is also de-energized, i.e., the video camera apparatus is not in use.

According to the second combination, the backlight lamp 11 is turned on, the liquid crystal display monitor 4 being stored with the display screen 4a reversed to face the outside and the liquid crystal display monitor 4 being available as a monitor screen for a reproduced picture.

According to the third combination, the liquid crystal display monitor 4 is opened in the normal direction and the video camera apparatus operates in a so-called ordinary shooting mode while a user is watching an image displayed on the display screen 4a. The video camera apparatus at this time is being used in the condition shown in FIG. 1.

According to the fourth combination, because the liquid crystal display monitor 4 is reversed to face the subject, the video camera apparatus operates in such a shooting mode that a user takes a picture with the display screen 4a facing toward the subject or a user takes his own picture.

According to the fifth combination, because the liquid crystal display monitor 4 is in the non-use condition in which it is stored with its display screen 4a directed toward the inside, a user can take a picture through the electronic viewfinder 3.

According to the sixth combination, there is presented the shooting state shown in FIG. 2 in which the liquid crystal display monitor 4 is stored with its display screen 4a directed toward the outside, and a user takes a picture through the electronic viewfinder 3. In this case, although the liquid crystal display monitor 4 is not in use while the backlight lamp 11 is turned off, a user can select the operation buttons by touch-operating the touch panel 5 attached to the liquid crystal display monitor 4.

According to the seventh combination, the video camera apparatus operates in a so-called ordinary shooting mode in which a user takes a picture while he is watching a subject picture displayed on the display screen 4a of the liquid crystal display monitor 4. In this case, while the electronic viewfinder 3 is extracted, it is de-energized for saving power.

According to the eighth combination, the video camera apparatus operates in a so-called face-to face shooting mode in which a photographer takes a picture using the electronic viewfinder 3 while allowing a photographee to look at a picture displayed on the liquid crystal display monitor 4.

Figure 4A:
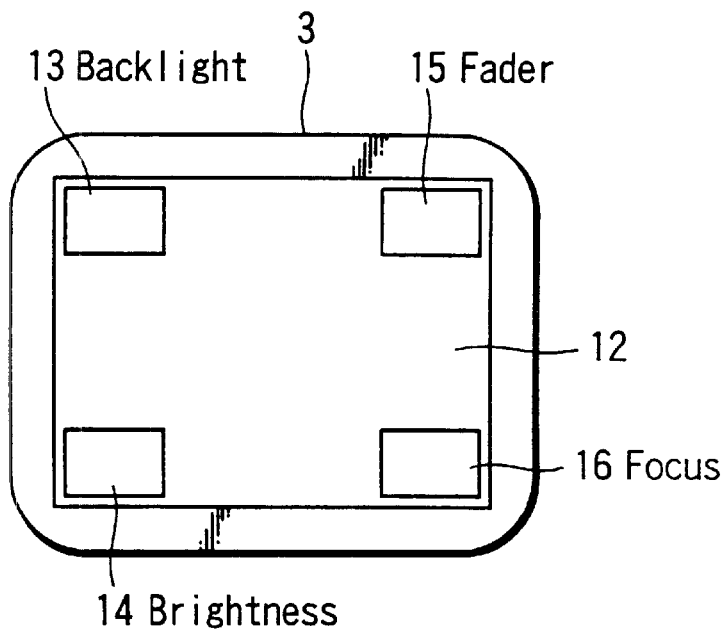
FIG. 4A is a diagram showing a finder screen.

While a user takes a picture using the electronic viewfinder 3, according to the sixth combination, the subject image is displayed on a finder screen 12 and also a plurality of operation buttons are displayed in the four corners of the finder screen 12 in the form of icons, as shown in FIG. 4A. Specifically, an icon 13 of "backlight" is displayed in the upper left corner of the finder screen 12, an icon 14 of "brightness" is displayed in the lower left corner of the finder screen, an icon 15 of "fader" is displayed in the upper right corner of the finder screen, and an icon 16 of "focus" is displayed in the lower right corner of the finder screen.

A user is able to select the operation buttons of the respective icons 13 to 16 by touch-operating the touch panel 5 in a blind-touch manner. Touch-sensitive areas of the touch panel 5 are disposed on the touch panel 5 at its four corners corresponding to the positions of the icons 13 to 16 indicating the respective operation modes on the finder screen 12. Specifically, as to the touch-sensitive portion which is used to operate the icon 13 of "backlight" on the finder screen 12, the upper left portion of the touch panel 5 forms a touch-sensitive area 17. Similarly, as to the touch-sensitive portion which is used to operate the lower left icon 14 of "brightness", the lower left portion of the touch panel 5 forms a touch-sensitive area 18. As to the touch-sensitive portion which is used to operate the upper right icon 15 of "fader", the upper right portion of the touch panel 5 forms a touch-sensitive area 19. As to the touch-sensitive portion which is used to operate the lower right icon 16 of "focus", the lower right portion of the touch panel 5 forms a touch-sensitive area 20.

While the respective icon areas are located at the positions shown by imaginary lines on the finder screen 12, the respective touch-sensitive areas 17 to 20 are formed as wider areas shown by broken lines in consideration of the fact that a user touches the touch panel 5 using a blind-touch operation. The areas other than the touch-sensitive areas 17 to 20 form a non-sensitive area 21 which is inoperable even if the touch panel 5 is depressed in that area.

Next, an example in which a user adjusts brightness of the finder screen 12 of the electronic viewfinder 3 using the touch panel 5 will be described.

Figure 4B:
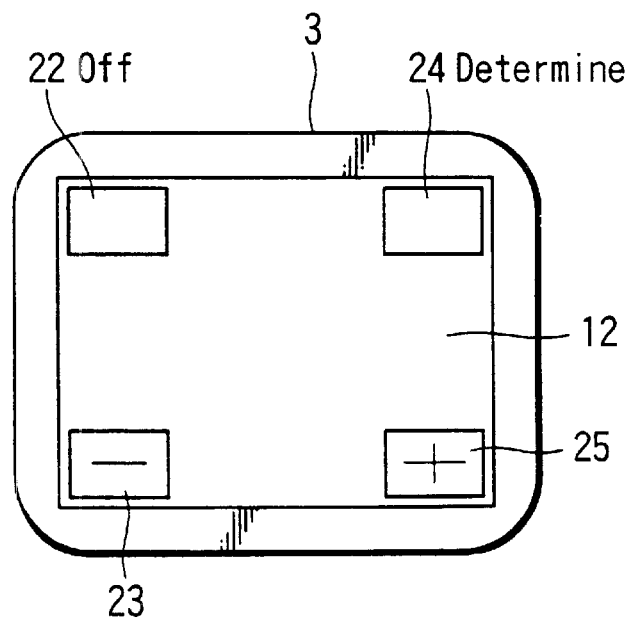
FIG. 4B is a diagram showing another finder screen.
Figure 5:
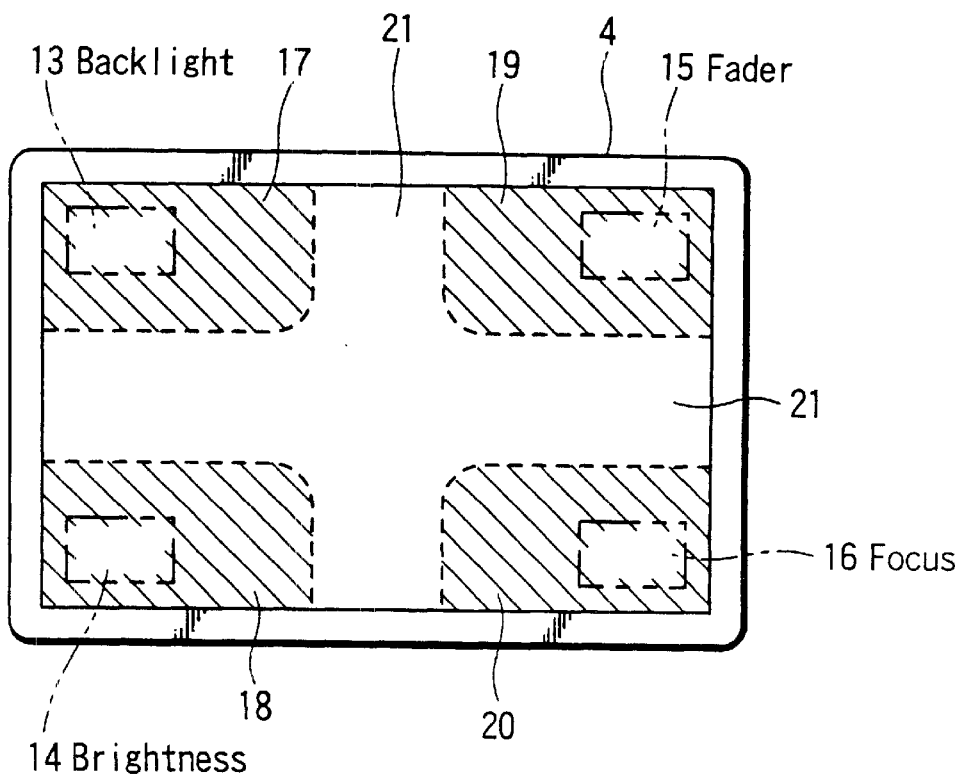
FIG. 5 is a diagram for explaining a sensitive area formed when a liquid crystal display panel is used as a touch panel.

A pulse signal is supplied from the micon 10 to the touch panel 5, so that the touch panel is made operable by touching. While a user takes a picture using the electronic viewfinder 3, the four icons 13 to 16 of the operation buttons are displayed in the four corners of the finder screen 12, as shown in FIG. 4A. In order to operate the icon 14 of "brightness" displayed in the lower left portion of the finder screen 12, a user should touch the touch-sensitive area 18 in the lower left portion of the touch panel 5 in a blind-touch manner. As a result, the detected signal obtained when the icon 14 of "brightness" is operated is output from the touch panel 5 to the micon 10. Then, a depicting signal from the micon 10 is converted into an image signal by the image display depicting IC 6, whereby icons 22 to 25 of four operation buttons are displayed in the four corners of the finder screen 12, as shown in FIG. 4B.

When lowering the brightness of the finder screen 12, a user should touch the touch panel 5 at its lower left touch-sensitive area 18 corresponding to the "−" icon 23. When raising the brightness of the finder screen, a user should touch the touch panel 5 at its lower right touch-sensitive area 20 corresponding to the "+" icon 25. After brightness has been adjusted, a user should touch the touch panel 5 at its upper right touch-sensitive area 19 corresponding to the "determine" icon 24. These detected signals issued when the touch panel 5 undergoes touch operation are output to the micon 10. Then, a depicting signal from the micon 10 is converted into an image signal by the image display depicting IC 6, whereby the brightness of the finder screen 12 is controlled and the adjustment operation is completed.

The operation buttons displayed in the four corners of the finder screen 12 in the form of icons are not limited to the above kinds of operation buttons and may be such operation buttons that are used to determine other operation modes.

Having described the case where four operation buttons are displayed in the four corners of the finder screen 12 in the form of icons and a user touch-operates the touch panel at its four corners corresponding to the positions of these operation buttons, the number of operation buttons is not limited so long as a user can operate touch-sensitive areas of the touch panel corresponding to the positions of the operation buttons.

Further, having described the embodiment in which the present invention is applied to a consumer video camera apparatus, the present invention is not limited thereto and can widely be applied to business video camera apparatus.

As described above, according to the present invention, because a user can operate the operation buttons displayed in the four corners of the finder screen 12 in the form of icons by blind touching the touch-sensitive areas displayed on the touch panel 5 at its four corners corresponding to the positions of these operation buttons, the touch positions of the touch panel 5 will be distinct so that a user can operate the touch panel in a blind touch manner leading to improved operability.

Further, by minimizing the number of operation buttons, it is possible to considerably reduce the number of times a user operates the buttons using the touch panel as compared with the previous art, thereby eliminating complicated operations and improving operability.

Moreover, according to the method of operating the image pickup apparatus of the present invention, because a plurality of operation modes are displayed at the predetermined positions of the screen in the form of icons and a user can selectively operate the operation buttons by touch operating the touch panel positions corresponding to the icon display positions on the finder screen, when a user takes a picture through the electronic viewfinder, the user can select and operate the respective operation buttons by blind touching the touch panel positions corresponding to the positions of the operation buttons displayed on the finder screen. Therefore, complicated operations will be eliminated and operability can be improved.

Having described preferred embodiments of the present invention with reference to the accompanying drawings, it is to be understood that the present invention is not limited to the above-mentioned embodiments and that various changes and modifications can be effected therein by one skilled in the art without departing from the spirit or scope of the present invention as defined in the appended claims.

What is claimed is:

1. An image pickup apparatus, comprising:
   a body having an image pickup element for converting an incident image into a video signal, a recording mechanism for recording the video signal and a playback mechanism for reproducing the video signal;
   an electronic viewfinder provided on the body to enable a user to watch a shooting subject image through an eyepiece, the viewfinder displaying a series of icons at predetermined positions thereof, each icon representing a distinct operation;
   a display externally provided on the body, the display having a touch panel provided thereon, the touch panel having a series of actuating areas located in set positions relative to the display, each set position corresponding to one of the predetermined positions of the viewfinder, whereby the operation represented by an icon in one of the predetermined positions can be selected by touching the actuating area of the touch panel in the set position corresponding to the one of the predetermined positions.

2. An image pickup apparatus comprising:

a body having an image pickup device for converting an image incident via an optical lens into image signals, and a recording/reproducing section for recording or reproducing the image signals;

an electronic viewfinder provided on the body for viewing an object being shot;

a liquid crystal display (LCD) monitor pivotably mounted to the body;

icon displaying means for displaying a plurality of icons at predetermined positions in the electronic viewfinder, each icon representing a distinct operation; and a touch panel provided on the LCD monitor for enabling touch operation by setting parts of the touch panel as actuating areas, wherein the actuating areas correspond to respective positions of the plurality of icons displayed in the electronic viewfinder.

3. An image pickup apparatus according to claim 2, wherein the predetermined positions are located at four corners of the viewfinder and the actuating areas are located at four corners of the touch panel.

4. An image pickup apparatus according to claim 2, wherein the LCD monitor has a backlight, and the backlight is turned off when the electronic viewfinder is enabled for a user to take a picture.

5. The image pickup apparatus according to claim 2, wherein the plurality of icons represent a first set of predetermined functions such that when one of the plurality of icons is selected each of the plurality of icons is replaced with a second set of icons representing a second set of functions associated with the selected one of the plurality of icons.

6. A method of operating an image pickup apparatus having a body, an electronic viewfinder mounted on the body to enable a user to watch a shooting subject image through an eyepiece, and a display externally mounted on the body, the display having a touch panel provided thereon, the method comprising:

displaying in the viewfinder a series of icons at predetermined positions thereof, each icon representing a distinct operation;

providing the touch panel with a series of actuating areas located in set positions relative to the display, each set position corresponding to one of the predetermined positions of the viewfinder; and selecting the operation represented by an icon in one of the predetermined positions by touching the actuating area of the touch panel in the set position corresponding to the one of the predetermined positions.

7. An image pickup apparatus comprising:

a body having an image pickup device for converting an image incident via an optical lens into image signals, and a recording/reproducing section for recording or reproducing the image signals;

an electronic viewfinder provided on the body for viewing an object being shot;

a liquid crystal display (LCD) monitor pivotably mounted to the body;

icon displaying means for displaying a plurality of icons at predetermined positions in the electronic viewfinder, each icon representing a distinct operation and covering a respective area of the electronic viewfinder; and a touch panel provided on the LCD monitor for enabling touch operation by setting parts of the touch panel as actuating areas, wherein the actuating areas correspond to respective positions of the plurality of icons displayed in the electronic viewfinder, and wherein each actuating area is larger than the respective area covered in the electronic viewfinder.

8. The image pickup apparatus according to claim 7, wherein the plurality of icons represent a first set of predetermined functions such that when one of the plurality of icons is selected each of the plurality of icons is replaced with a second set of icons representing a second set of functions associated with the selected one of the plurality of icons.

* * * * *